United States Patent
Yarramsetty et al.

(10) Patent No.: US 12,244,502 B1
(45) Date of Patent: Mar. 4, 2025

(54) CONTROLLED MESSAGE ROUTING FOR TRANSACTION PROCESSING PLATFORMS

(71) Applicant: AMERICAN EXPRESS TRAVEL RELATED SERVICES COMPANY, INC., New York, NY (US)

(72) Inventors: Samba Siva Rao Yarramsetty, Phoenix, AZ (US); Benjamin J. Cane, Peoria, AZ (US); Steve T. Chiappetti, Phoenix, AZ (US); Sudheer Nunapalli, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 18/458,701

(22) Filed: Aug. 30, 2023

(51) Int. Cl.
*H04L 47/193* (2022.01)

(52) U.S. Cl.
CPC .................. *H04L 47/193* (2013.01)

(58) Field of Classification Search
CPC .................................. H04L 47/193
See application file for complete search history.

(56) References Cited

U.S. PATENT DOCUMENTS

| | | | | |
|---|---|---|---|---|
| 2007/0028139 A1* | 2/2007 | Wahl | ................. | G06F 11/2066 714/6.31 |
| 2013/0332573 A1* | 12/2013 | Hegland | ................. | H04L 69/40 709/218 |
| 2018/0167263 A1* | 6/2018 | Patel | ................. | H04L 47/193 |

* cited by examiner

Primary Examiner — Benjamin M Thieu
(74) Attorney, Agent, or Firm — Sterne, Kessler, Goldstein, & Fox P.L.L.C.

(57) ABSTRACT

Disclosed herein are system, method, and computer program product embodiments for controlling message routing for transaction processing platforms. The routing of transaction messages mitigates service disruptions to client systems facilitating transactions with consumers. A connection management and transaction routing platform (CMTRP) system applies routing configurations, such as passthrough, throttling, and/or maintenance toggle configurations, to facilitate the routing of transaction messages. This routing may route message to different transaction processing platforms and/or different instances of transaction processing platforms. The CMTRP system also routes transaction messages when transaction processing functionality is being migrated from a first transaction processing platform to a second transaction processing platform and/or when a platform is undergoing maintenance.

20 Claims, 7 Drawing Sheets

CONTROLLED MESSAGE ROUTING FOR TRANSACTION PROCESSING PLATFORMS

BACKGROUND

Field

This field is generally related to message routing configurations for transaction processing platforms to avoid service disruptions to client systems.

Related Art

As enterprise computing systems and technologies continue to evolve, businesses face the issue of scalability. To improve scalability, businesses may migrate to newer computing platforms. For example, data processing may have been performed on monolithic systems or distributed platforms. These data centers and/or data processing systems may be migrated to cloud-based platforms and/or to platforms using a microservice architecture. As this migration occurs, however, customers or client systems interfacing with the existing platform may still require the data management, functionality, and/or data processing provided by the existing data processing platform. For example, data querying or authentication functionality may still be required by the client systems. Additionally, the migration process may uncover defects or bugs in the new computing platform. Enterprises operating these platforms may wish to avoid exposing client systems to such defects or bugs, which may impede functionality or result in service disruptions. Enterprises may also wish to avoid such disruptions when conducting platform maintenance as well.

BRIEF SUMMARY

Disclosed herein are system, apparatus, device, method and/or computer program product embodiments, and/or combinations and sub-combinations thereof, for controlling message routing for transaction processing platforms. The controlling of message routing addresses and/or avoids service disruptions to client systems. A connection management and transaction routing platform (CMTRP) system may use passthrough, throttling, and/or maintenance toggle configurations to facilitate the routing of messages to mitigate disruptions.

In some embodiments, a connection management and transaction routing platform (CMTRP) system may manage and/or route messages between one or more transaction processing platforms. The transaction processing platforms may manage user data and/or data used to facilitate transactions. For example, the transaction platforms may be implemented in a payment network. Merchant systems may interface with the transaction platforms to determine whether users are authorized to conduct transactions and/or whether transactions initiated with the merchant systems are authorized. For example, a consumer may present a credit card or a debit card at a point of sale terminal connected to a merchant computing system to conduct a transaction. The merchant computing system may provide data packets containing information related to the transaction to a transaction processing platform to determine whether the transaction is authorized. This transaction message or data packet may be routed to the transaction processing platform via one or more load balancers and/or routers. As further described below, other types of transaction messages may also be communicated to a transaction processing platform for processing as well.

The CMTRP system may be implemented to intercept received transaction messages prior to reaching a particular transaction processing platform. For example, this configuration may be beneficial in the contexts where a migration of data processing is in the process of occurring and/or when maintenance of a transaction processing platform is being conducted. In the migration context, data processing may be migrated from a first transaction processing platform to a second transaction processing platform. In some embodiments, the first transaction processing platform may be an older platform while the second transaction processing platform may be a newer platform. For example, the first transaction processing platform may be implemented as a monolithic system and/or a distributed computing platform. The second transaction processing platform may be a cloud-based platform and/or a platform using a microservice architecture.

In the migration context, data processing functions implemented in the first transaction processing platform may still be in the process of development and/or implementation at the second transaction processing platform. In this manner, such functions may not yet be available at the second transaction processing platform despite client systems relying on this functionality. Attempts to execute such functions using the second transaction processing platform may yield errors and/or cause disruptions in service for the client systems. The CMTRP system may address and/or avoid such issues by utilizing passthrough and/or throttling configurations. As further described below, the CMTRP system may implement a Transmission Control Protocol (TCP) connection manager and/or a transaction router to implement these configurations. These configurations may also be customizable and/or changed by administrators of the CMTRP system and/or the transaction processing platforms. In some embodiments, the configurations may be set according to client system specifications.

When implementing a passthrough configuration, the CMTRP system may route messages to the first transaction processing platform. For example, a client system may have established a connection with the second transaction processing platform as part of the migration process. Some transaction functionality, however, may still be in development and/or not yet implemented at the second transaction processing platform. In this scenario, the CMTRP system may implement a passthrough configuration to route messages to the first transaction processing platform. This routing may avoid disruptions to servicing the client system.

To implement the passthrough configuration, a TCP connection manager implemented in the CMTRP system may establish a mirrored connection to the first transaction processing platform. The CMTRP system may then route transaction messages to the first transaction processing platform via the mirrored connection. This passthrough routing may avoid routing transaction messages to the second transaction processing platform where functionality may not yet be available to process the transaction messages. In some embodiments, this passthrough configuration may be applied according to individual client systems. For example, messaging traffic from one client system may be routed to the second transaction processing platform while messaging traffic from another client system may be routed to the first transaction processing platform according to the passthrough configuration. By implementing the passthrough configuration, the CMTRP system may facilitate access to the first transaction processing platform via a mirrored connection.

In some embodiments, the CMTRP system may implement a throttling configuration. The throttling configuration may be implemented separately and/or in conjunction with the passthrough configuration. The throttling configuration may route some transaction messages to the first transaction processing platform while routing others to the second transaction processing platform. The throttling configuration may include one or more conditions for routing transactions messages. An example throttling condition may be based on a percentage of traffic. For example, the throttling condition may specify that one percent of transaction messages is to be routed to the second transaction processing platform while the remaining ninety-nine percent of transaction messages is to be routed to the first transaction processing platform. In this example, a subset of transaction messages may be used to test the functionality of the second transaction processing platform. This may be a canary configuration where limited message traffic is routed to the second transaction processing platform to identify any disruptions and/or errors. This may be used to minimize disruptions as a client system is being transitioned to being serviced by the second transaction processing platform. As migration continues, the percentage of traffic routed to the second transaction processing platform may be increased. This may be gradual and/or customizable using the CMTRP system.

Other throttling conditions may include throttling based on message type. For example, certain message types may be supported by the second transaction processing platform while other message types may be supported by the first transaction processing platform. Similarly, for testing purposes, the CMTRP system may be configured to route certain message types to the second transaction processing platform. In this case, the CMTRP system may condition the throttling based on message type.

In some embodiments, a sharding technique may be implemented with the throttling configuration. Sharding may identify a particular client system, merchant system, merchant terminal, point of sale device, and/or other requester system to route transaction messages. For example, sharding may use an identifier for routing transaction messages. The routing may be based on a particular identifier corresponding to the system providing the transaction message. For example, a particular merchant system's messaging traffic may be routed to the second transaction processing platform. In some embodiments, the sharding may provide additional granularity. For example, a particular merchant system may utilize multiple point of sale devices with corresponding identifiers. The throttling configuration may indicate that messages from particular point of sale devices are to be routed to the second transaction processing platform. Similar to the percentage example, routing some transaction messages to the second transaction processing platform may allow for testing and/or identifying potential issues with the second transaction processing platform. For example, this may allow for beta testing. The CMTRP system may use source identifiers corresponding to message packets to perform the sharding and to route the transaction messages.

The CMTRP system may implement both throttling and sharding in some configurations. For example, sharding may be implemented to route messages based on a merchant system identifier. Throttling may further be implemented to route a particular percentage of those messages to the second transaction processing platform. For example, this may be ten percent. In this example configuration, ten percent of traffic for a particular merchant system will be routed to the second transaction processing platform while the remaining ninety percent of traffic will be routed to the first transaction processing platform. In this manner, both throttling and sharding may be implemented and/or customized as the development and/or migration of the second transaction processing platform continues.

As further explained below, the throttling and/or sharding conditions may be implemented at a transaction router in the CMTRP system. The transaction router may implement throttling logic and/or connection logic. The transaction router may be located downstream relative to the TCP connection manager.

In some embodiments, the CMTRP system may also implement a maintenance toggle. A maintenance toggle may be used when a particular transaction processing platform is taken offline for maintenance. This may be used separately and/or in conjunction with the passthrough and/or the throttling described above. In some embodiments, the CMTRP system may apply a maintenance toggle to route messages when the second transaction processing platform is being taken offline for maintenance. In this scenario, the CMTRP system may utilize multiple instances of the transaction processing platform. For example, the CMTRP system may receive a first transaction message and route the first transaction message to a first instance of a transaction processing platform. The CMTRP system may then receive a command from an administrator signal to set the maintenance toggle. This toggle may indicate to the CMTRP system to route transaction messages from the first instance of the transaction processing platform to a second instance of the transaction processing platform.

If the first transaction message is still being processed by the first instance of the transaction processing platform, the CMTRP system may still facilitate response messages from the first instance the system sending the first transaction message. In this way, disruptions of service may also be avoided despite the maintenance scheduled for the transaction processing platform. When receiving subsequent transaction messages, the CMTRP system may route subsequent messages to the second instance of the transaction processing platform.

As further explained below, the CMTRP system may implement one or more configurations corresponding to passthrough, throttling, and/or maintenance toggling. With this message routing control. The CMTRP system may provide improvements to enterprise computing systems. The CMTRP system may provide benefits for computing platforms that are currently in development and/or migration. For example, the CMTRP system may aid in avoiding errors and/or disruptions of service to client systems. For example, this may avoid a potential dropping of transaction data. By providing seamless responses and routing for messages, the CMTRP system may provide computational resource savings by avoiding unnecessary processing due to failed message processing. The CMTRP system therefore alleviates potential errors and/or the need for a client system to re-send messages that failed to process successfully. The CMTRP system further provides a tool for testing and/or troubleshooting transaction processing platform. For example, by providing control over an amount of messaging to be routed to a new transaction processing platform, more efficient testing may be performed while still avoiding larger and/or potentially catastrophic processing errors.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for routing transaction messages to transaction processing platforms.

In some embodiments, a connection management and transaction routing platform (CMTRP) system may route transaction messages according to one or more passthrough, throttling, and/or maintenance toggle configurations. The CMTRP system may combine and/or execute one or more of the configurations to facilitate the routing of transaction messages from client devices. By utilizing these configurations, the CMTRP system may avoid service disruptions and/or may aid in facilitating the migration of services from a first transaction processing platform to a second transaction processing platform. The CMTRP system may aid in providing a seamless transition and/or aid with testing the functionality of the second transaction processing platform.

Various embodiments of these features will now be discussed with respect to the corresponding figures.

Figure 1:
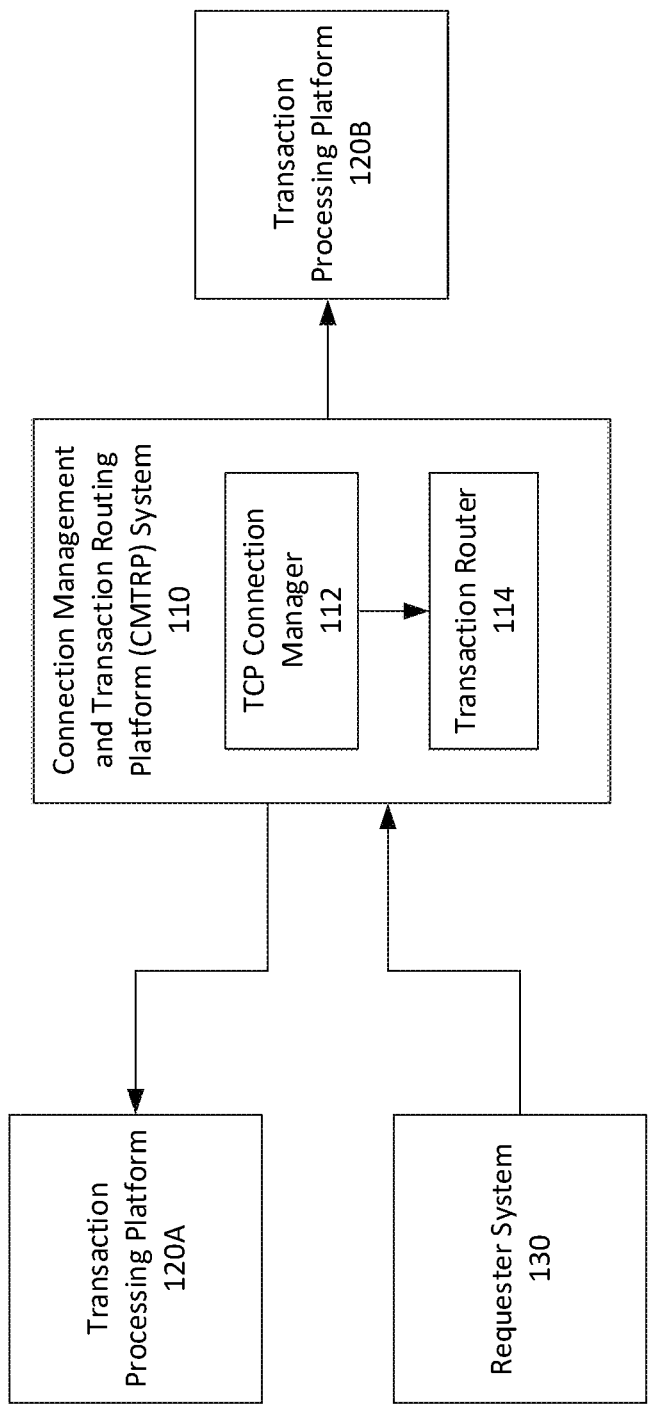
FIG. 1 depicts a block diagram of a transaction message routing environment, according to some embodiments.

FIG. 1 depicts a block diagram of a transaction message routing environment 100, according to some embodiments. Transaction message routing environment 100 includes connection management and transaction routing platform (CMTRP) system 110, first transaction processing platform 120A, second transaction processing platform 120B, and/or requester system 130. CMTRP system 110 further includes Transmission Control Protocol (TCP) connection manager 112 and/or transaction router 114. As further described below, CMTRP system 110 may execute the methods and/or programming described with reference to FIG. 3, FIG. 4, FIG. 5, and/or FIG. 6. CMTRP system 110 may utilize these methods separately and/or in combination to route transaction messages to first transaction processing platform 120A and/or second transaction processing platform 120B.

CMTRP system 110 may be a computer system such as computer system 700 described with reference to FIG. 7. For example, CMTRP system 110 may be implemented using one or more servers and/or databases. In some embodiments, CMTRP system 110 may further include one or more operating systems and/or proxy systems. In some embodiments, CMTRP system 110 may include a switch, a core switch, and/or switching functionality.

For example, CMTRP system 110 may use a TCP connection manager 112 to interface with requester system 130 and/or to generate a mirrored connection to first transaction processing platform 120A. TCP connection manager 112 may manage the physical connections for CMTRP system 110. TCP connection manager 112 may be implemented on a server and/or may be a TCP proxy. TCP connection manager 112 may serve as an intermediary system between a client server and/or a destination server. The destination server may be one used on first transaction processing platform 120A and/or second transaction processing platform 120B. TCP connection manager 112 may route messages, such as transaction messages, received from client systems to first transaction processing platform 120A and/or second transaction processing platform 120B. TCP connection manager 112 may also forward data received from first transaction processing platform 120A and/or second transaction processing platform 120B to the client system. As further explained below, TCP connection manager 112 may execute the passthrough configuration for message routing and/or determine whether a passthrough configuration has been set.

In some embodiments, CMTRP system 110 may also use a Tiny Proxy service to interface with requester system 130. The Tiny Proxy service may interface with TCP connection manager 112. Requester system 130 may be a merchant computing system and/or an acquirer system for facilitating transactions. In some embodiments, the Tiny Proxy may also interface with an issuer computing system as further described with reference to FIG. 2. CMTRP system 110 may also include an intranet web proxy, an internet web proxy, and/or a web router. These may aid in facilitating communications with external systems. For example, CMTRP system 110 may receive configuration commands from an administrator system via one or more of these proxies. In some embodiments, CMTRP system 110 may also include one or more load balancers.

CMTRP system 110 also includes a transaction router 114. Transaction router 114 may be a router and/or a core router configured to implement one or more routing configurations. These routing configurations may be logical instructions for executing and/or may include the throttling and/or maintenance toggle configurations. Executable instructions for implementing the throttling and/or maintenance toggle configurations may be stored in one or more caches and/or databases of CMTRP system 110. For example, transaction router 114 may interface with a business configuration cache and/or a client state cache. In some embodiments, transaction router 114 may be located in a downstream configuration relative to the TCP connection manager 112. In this case, TCP connection manager 112 may determine whether a passthrough configuration is implemented at CMTRP system 110. If a passthrough configuration is not used, transaction router 114 may be used to determine whether a throttling configuration and/or a maintenance toggle configuration has been set. Based on the setting, transaction router 114 may direct transaction messages to second transaction processing platform 120B. In some embodiments, transaction router 114 may direct transaction messages to one or more instances of second transaction processing platform 120B. Transaction router 114 may manage the logical connections to facilitate throttling operations and/or maintenance toggle operations. This may include a heartbeat process to maintain connections.

To configure CMTRP system 110, an administrator and/or developer computing system may provide commands to CMTRP system 110. In some embodiments, CMTRP system 110 may be accessed using a computing device such as a desktop workstation, laptop or notebook computer, netbook, tablet, smart phone, and/or other computing device. In some embodiments, to CMTRP system 110 may be implemented as an application in an enterprise computing system. An administrator and/or developer operating and/or maintaining the enterprise computing system may configure CMTRP system 110. In some embodiments, first transaction processing platform 120A and/or second transaction processing platform 120B may also be implemented in the enterprise computing system.

First transaction processing platform 120A and/or second transaction processing platform 120B may be a computer system such as computer system 700 described with reference to FIG. 7. For example, first transaction processing platform 120A and/or second transaction processing platform 120B may be implemented using one or more servers and/or databases. First transaction processing platform 120A and/or second transaction processing platform 120B may manage user data and/or data used to facilitate transactions. For example, first transaction processing platform 120A and/or second transaction processing platform 120B may be implemented in a payment network. Merchant systems may use such transaction processing platform to facilitate payments and/or conduct transactions. For example, a transaction processing platform may determine and/or indicate to merchant systems whether users are authorized to conduct transactions and/or whether transactions initiated with the merchant systems are authorized. For example, a consumer may present a credit card or a debit card at a point of sale terminal connected to a merchant computing system to conduct a transaction. In this case, the merchant system, which may be reflected as requester system 130, may transmit one or more messages and/or data packets to a transaction processing platform to determine whether the transaction is authorized.

CMTRP system 110 may receive the packet and determine whether to route the message to first transaction processing platform 120A and/or second transaction processing platform 120B. This routing may occur according to the passthrough, throttling, and/or maintenance toggle configurations discussed throughout this description. In some embodiments, the merchant system and/or requester system 130 may be blind to the particular transaction processing platform 120 servicing the request. This may be a backend process controlled by CMTRP system 110. CMTRP system 110 may provide a return response message to requester system 130. Requester system 130 may not be aware of the particular transaction processing platform 120 providing the response. In this manner, CMTRP system 110 may facilitate the processing of messages and/or requests. This may occur during the migration of functionality from first transaction processing platform 120A to second transaction processing platform 120B.

Figure 2:
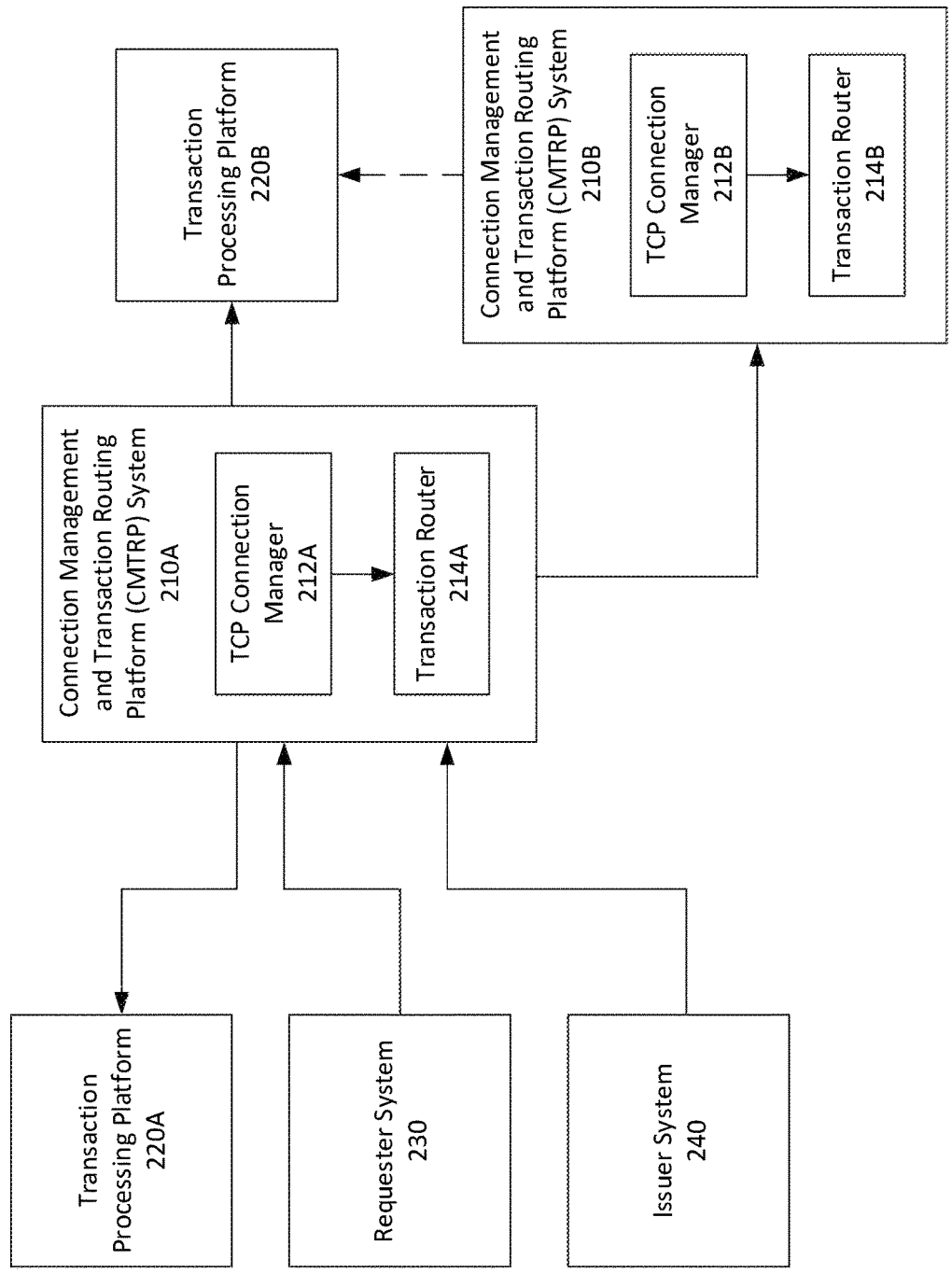
FIG. 2 depicts a block diagram of a transaction message routing environment using multiple connection management and transaction routing platform (CMTRP) systems, according to some embodiments.

FIG. 2 depicts a block diagram of a transaction message routing environment 200 using multiple CMTRP systems 210, according to some embodiments. Transaction message routing environment 200 may be used when a maintenance toggle configuration is implemented. In this case, multiple data centers and/or CMTRP systems 210 may be used to facilitate the processing of transaction messages when a particular transaction processing platform is taken offline for maintenance.

Transaction message routing environment 200 includes first CMTRP system 210A, second CMTRP system 210B, first transaction processing platform 220A, second transaction processing platform 220B, requester system 230, and/or issuer system 140. First CMTRP system 210A further includes transmission control protocol (TCP) connection manager 212A and/or transaction router 214A. Second CMTRP system 210B further includes transmission control protocol (TCP) connection manager 212B and/or transaction router 214B. First transaction processing platform 220A, second transaction processing platform 220B, and/or requester system 230 may operate in a manner similar to first transaction processing platform 120A, second transaction processing platform 120B, and/or requester system 130 as described with reference to FIG. 1. Issuer system 240 may correspond to a computing system where information may be retrieved to process a transaction request from requester system 230. In some embodiments, issuer system 240 may correspond to a card issuing entity and/or may manage data corresponding to the card issuing entity. Issuer system 240 may maintain consumer data used to execute a transaction.

As further described below, CMTRP systems 210A, 210B may execute the methods and/or programming described with reference to FIG. 3, FIG. 4, FIG. 5, and/or FIG. 6. CMTRP system 110 may utilize these methods separately and/or in combination to route transaction messages to first transaction processing platform 220A and/or second transaction processing platform 220B.

First CMTRP system 210A may also interact with second CMTRP system 210B when a maintenance toggle configuration has been applied at first CMTRP system 210A. In this case, second transaction processing platform 220B may be taken down for maintenance. In this case, when first CMTRP system 210A receives a transaction message from requester system 230, first CMTRP system 210A may route the transaction message to second CMTRP system 210B. The second CMTRP system 210B may manage and/or facilitate communications with a second instance of a transaction processing platform 220. This second instance may correspond to first transaction processing platform 220A and/or second transaction processing platform 220B. Upon receiving the traffic at the second CMTRP system 210B, transaction router 214B may route the transaction message to perform a localized processing for the second instance of the particular transaction processing platform 220.

In some embodiments, an infrastructure modification may be made to the transaction processing platform 220. In this case, a maintenance toggle may be applied by first CMTRP system 210A. This may divert traffic and/or messaging to second CMTRP system 210B and/or the second instance of the transaction processing platform 220.

As further explained with reference to FIG. 6, the maintenance toggle may also facilitate request and response communications. For example, request messages from requester system 130 may cause first CMTRP system 210A to return a response. This requesting and response may be asynchronous. In some embodiments, the response may be provided by issuer system 240. When processing a request that corresponds to a response but the maintenance toggle configuration has been applied, first CMTRP system 210A may still facilitate the response message prior to diverting additional messaging to the second instance of the particular transaction processing platform 220. In this manner, response messages may be returned to the requester system 230 to avoid disruptions in service and/or dropped messages. This may reduce negative impacts to client system service even when the transaction processing platform 220 is taken offline for maintenance. The further processing of subsequent transaction messages may occur at second CMTRP system 210B and/or at the second instance of the particular transaction processing platform 220B.

Figure 3:
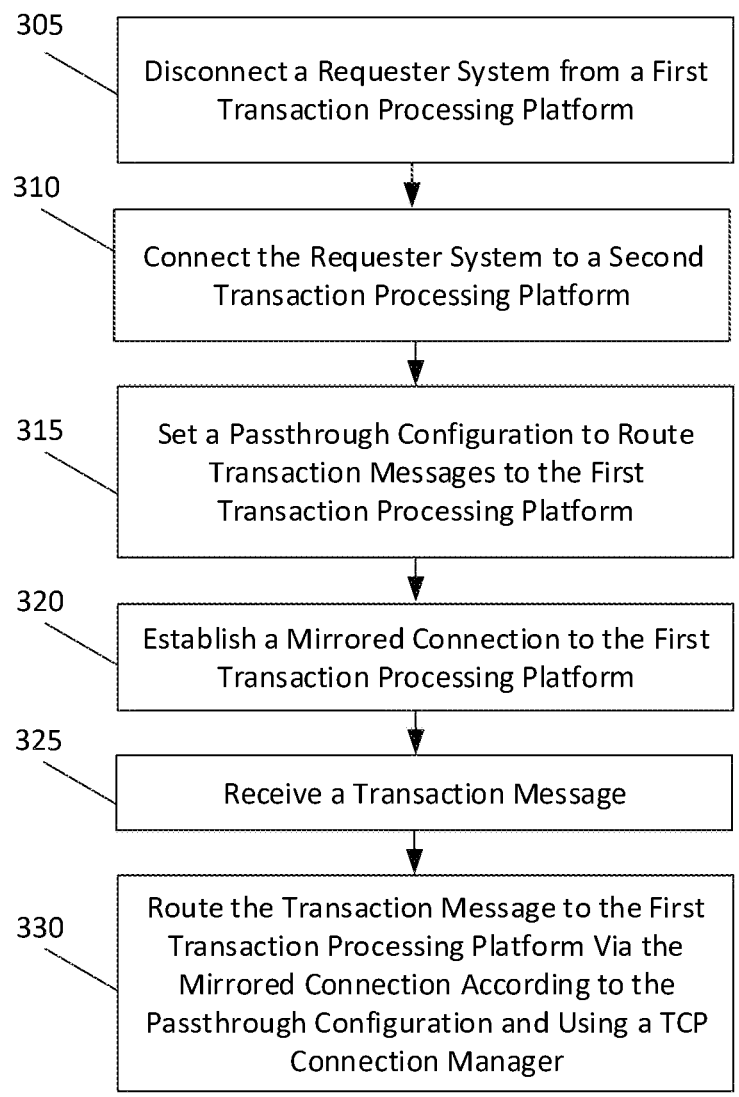
FIG. 3 depicts a flowchart illustrating a method for utilizing a passthrough configuration, according to some embodiments.

FIG. 3 depicts a flowchart illustrating a method 300 for utilizing a passthrough configuration, according to some embodiments. Method 300 shall be described with reference to FIG. 1; however, method 300 is not limited to that example embodiment. For example, method 300 may also be implemented in the environment described with reference to FIG. 2.

In an embodiment, CMTRP system 110 may utilize method 300 to route traffic and/or transaction messages to a first transaction processing platform 120A. This routing may route messages away from second transaction processing platform 120B. The foregoing description will describe an embodiment of the execution of method 300 with respect to CMTRP system 110. While method 300 is described with reference to CMTRP system 110, method 300 may be executed on any computing device, such as, for example, the computer system described with reference to FIG. 7 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3, as will be understood by a person of ordinary skill in the art.

At 305, CMTRP system 110 disconnects a requester system 130 from a first transaction processing platform 120A. As described with reference to FIG. 1, requester system 130 may be a merchant computing system and/or an acquirer system for facilitating transactions. The merchant system may manage and/or facilitate one or more point of sale devices. In some embodiments, the merchant system may facilitate electronic commerce and/or be an online commerce system. Requester system 130 may have interfaced with first transaction processing platform 120A to facilitate transactions and/or exchange information related to user transaction accounts. For example, requester system 130 may communicate with first transaction processing platform 120A to determine whether users are authorized to conduct transactions and/or whether transactions initiated with the merchant systems are authorized. For example, a consumer may present a credit card or a debit card at a point of sale terminal connected to a merchant computing system to conduct a transaction. The merchant computing system may have been providing data packets containing information related to the transaction to first transaction processing platform 120A to determine whether the transaction is authorized.

An administrator of first transaction processing platform 120A, however, may migrate functionality and/or service provided by first transaction processing platform 120A to second transaction processing platform 120B. Service for clients, customers, and/or requester systems 130 may be migrated to second transaction processing platform 120B. For example, second transaction processing platform 120B may provide additional flexibility, functionality, and/or scalability as previously described. As part of this process, CMTRP system 110 disconnects a requester system 130 from a first transaction processing platform 120A. This disconnection may occur, for example, during a maintenance period for a client corresponding to requester system 130. Such a maintenance period may be periodic.

At 310, CMTRP system 110 connects the requester system 130 to a second transaction processing platform 120B. This connection may also occur during the maintenance period. CMTRP system 110 may establish one or more data connections and/or implement one or more communication protocols to facilitate communications between requester system 130 and second transaction processing platform 120B. In some embodiments, the establishing of these connections and/or the disconnecting described with reference to 305 may be obscured from requester system 130. For example, from the perspective of requester system 130, the service and/or data received from second transaction processing platform 120B may be the same as the data received from first transaction processing platform 120A. In some embodiments, the format of the data may also be the same returned. CMTRP system 110 may facilitate the exchange of data and/or the formatting of data returned to requester system 130.

At 315, CMTRP system 110 sets a passthrough configuration to route transaction message to the first transaction processing platform 120A. In some embodiments, the setting of the passthrough configuration may occur after CMTRP system 110 has connected requester system 130 to second transaction processing platform 120B. For example, CMTRP system 110 may receive a command and/or instruction from an administrator system setting the passthrough configuration. The passthrough configuration may be an executable instruction that configures CMTRP system 110 to route transaction messages received from requester system 130 to first transaction processing platform 120A. CMTRP system 110 may store the passthrough configuration in memory and/or execute the passthrough configuration when receiving transaction messages from requester system 130. In some embodiments, the passthrough configuration may be specific for a particular requester system 130. As described throughout this description, CMTRP system 110 may be configured to route transaction messages based on the particular requester system 130 providing the transaction message.

The passthrough configuration may be used to route transaction messages to first transaction processing platform 120A. In some embodiments, when the passthrough configuration is set, all of the transaction messages from requester system 130 are routed to first transaction processing platform 120A. In some embodiments, transaction messages received by CMTRP system 110 are meant to be sent to the second transaction processing platform 120B in view of the established connection. The passthrough configuration, however, may instead route messages to the first transaction processing platform 120A. This may avoid potential disruptions if second transaction processing platform 120B is still being developed. For example, this may be applied when second transaction processing platform 120B does not yet have functionality to support processing of certain types of transaction messages and/or if such functionality are in need of repair. In some embodiments, the passthrough configuration may be used to route data packets. The routing may be performed at the packet level and/or at the payload level.

At 320, CMTRP system 110 establishes a mirrored connection to the first transaction processing platform 120A. TCP connection manager 112 within CMTRP system 110 may establish the mirrored connection. For example, TCP connection manager 112 may maintain the physical connection to first transaction processing platform 120A. Using the mirrored connection, TCP connection manager 112 may route transaction messages to first transaction processing platform 120A. This may aid in avoiding disruptions of service to requester system 130. For example, while migration and/or development is occurring at second transaction processing platform 120B, processing of transaction messages received from requester system 130 may occur at first transaction processing platform 120A.

In some embodiments, the mirrored connection may amount to the CMTRP system 110 maintaining two connections. This includes one from the requester system 130 to second transaction processing platform 120B as well as one from CMTRP system 110 to first transaction processing platform 120A.

At 325, CMTRP system 110 receives a transaction message. For example, CMTRP system 110 receives the transaction message from requester system 130. The transaction message may correspond to a transaction and/or may facilitate future transactions occurring at a merchant system. In some embodiments, the transaction message may include metadata such as a merchant identifier and/or other parameters that may be used by CMTRP system 110 to route messages. Examples of transaction messages may include messages related to transaction authorizations. This may be pre-authorization and/or post-authorization requests. For example, this may include authorizing the use of a credit card or debit card. The transaction message may also be used to facilitate fraud checking messages, facilitate issuer approval, and/or report generation. The transaction messages may also include reversal requests. This may occur due to a time-out at a point of sale which may experience a network problem and/or not receive a response. The transaction message may also include a void request and/or an adjustment request related to transactions. CMTRP system 110 may intelligently route these transactions messages as explained throughout this description.

At 330, CMTRP system 110 routes the transaction message to the first transaction processing platform 120A via the mirrored connection according to the passthrough configuration and using a TCP connection manager 112. For example, after receiving the transaction message, CMTRP system 110 may check for any set routing configurations. CMTRP system 110 may determine that the passthrough configuration has been set. In this case, CMTRP system 110 routes the transaction message to the first transaction processing platform 120A. This may occur via TCP connection manager 112 and the mirrored connection previously established.

First transaction processing platform 120A may then process the transaction message and return a result message to CMTRP system 110. For example, the transaction message may request an authorization check and/or a determination of whether to authorize a transaction occurring at requester system 130. Upon performing this check, first transaction processing platform 120A may return the result to CMTRP system 110. CMTRP system 110 may then return the result to requester system 130. CMTRP system 110 may perform such transaction message routing and processing for additional transactions messages as well. This may occur according to the passthrough configuration.

Figure 4:
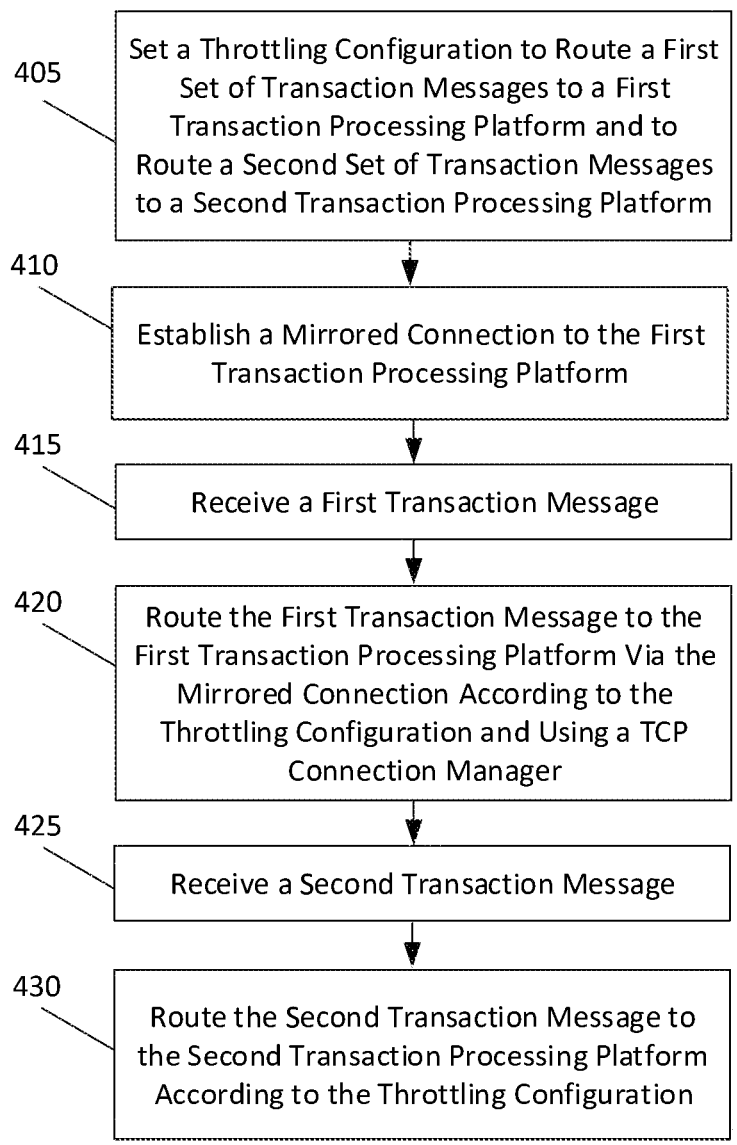
FIG. 4 depicts a flowchart illustrating a method for utilizing a throttling configuration, according to some embodiments.

FIG. 4 depicts a flowchart illustrating a method 400 for utilizing a throttling configuration, according to some embodiments. Method 400 shall be described with reference to FIG. 1; however, method 400 is not limited to that example embodiment. For example, method 400 may also be implemented in the environment described with reference to FIG. 2.

In an embodiment, CMTRP system 110 may utilize method 400 to divide the routing traffic and/or transaction messages to first transaction processing platform 120A and second transaction processing platform 120B. This dividing of the routing may be based on one or more conditions. For example, a percentage of traffic may be specified as being directed to first transaction processing platform 120A and/or second transaction processing platform 120B. The foregoing description will describe an embodiment of the execution of method 400 with respect to CMTRP system 110. While method 400 is described with reference to CMTRP system 110, method 400 may be executed on any computing device, such as, for example, the computer system described with reference to FIG. 7 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 4, as will be understood by a person of ordinary skill in the art.

At 405, CMTRP system 110 sets a throttling configuration to route a first set of transaction messages to a first transaction processing platform 120A and to route a second set of transaction messages to a second transaction processing platform 120B. Similar to the passthrough configuration, the throttling configuration may also be a routing configuration used by CMTRP system 110 to route transaction messages. In some embodiments, CMTRP system 110 may be applying a passthrough configuration and then may be switched to a throttling configuration. The throttling condition may be managed and/or used by transaction router 114.

The throttling configuration may include one or more conditions indicating whether a particular transaction message is to be routed to first transaction processing platform 120A or second transaction processing platform 120B. When receiving a transaction message, CMTRP system 110 may apply the one or more conditions to route the transaction message. For example, a throttling configuration condition may include routing transaction messages based on a percentage of traffic. For example, one percent of traffic may be routed to second transaction processing platform 120B while ninety-nine percent of the traffic may be routed to first transaction processing platform 120A. This may occur in the manner previously described. The percentage may also be adjusted. For example, an increase in traffic to second transaction processing platform 120B may be applied as additional development and/or functionality is added to second transaction processing platform 120B.

The throttling configuration conditions may also be based on message type and/or the type of functionality or processing performed. For example, some functionality and/or processing may be supported by second transaction processing platform 120B. This may be functionality that has been developed to emulate functionality from first transaction processing platform 120A. In this case, the throttling configuration may direct CMTRP system 110 to route messages requesting such functionality to second transaction processing platform 120B. Other message may still be routed to first transaction processing platform 120A. In some embodiments, second transaction processing platform 120B may provide functionality that is not available on first transaction processing platform 120A. For example, a balance inquiry function may be available on second transaction processing platform 120B but not available on first transaction processing platform 120A. In this manner, CMTRP system 110 routes transaction messages requesting such functionality to second transaction processing platform 120B.

Similarly, key exchange functionality may also be used for throttling. The keys may be used for encryption of messages. For example, transaction messages identified as used for key exchange may be routed to first transaction processing platform 120A. This may occur even if both first transaction processing platform 120A and second transaction processing platform 120B may be capable of facilitating the key exchange operations. When using a particular platform, such as first transaction processing platform 120A, however, keys are still synchronized to the other platform, such as second transaction processing platform 120B. This synchronization may allow for transaction message processing to be performed by both platforms. This may synchronize PIN and/or MAC data to enable functionality as well. Keys may be updated as well and/or shared between platforms. For example, CMTRP system 110 may monitor a database with key exchange data. CMTRP system 110 may then import key data information into the other platform. This may provide synchronization and/or flexibility for processing transaction messages at the second transaction processing platform 120B.

In some embodiments, routing based on functionality may also be split between first transaction processing platform 120A and second transaction processing platform 120B. For example, each platform may provide one or more sub-functions of a particular processing.

The throttling configuration may also include a type of routing referred to as sharding. Sharding may route transaction messages based on identifiers. For example, the routing of transactions messages may depend on a merchant identifier, terminal or point of sale identifier, and/or message type identification. In some embodiments, a client identifier may also be used. For example, this may correspond to metadata used by TCP connection manager 112 and/or correspond to one or more ports of a requester system 130. In some embodiments, a distributed network may include multiple processing centers. These may be located in different geographic areas. The sharding or throttling may be performed according to the particular geographic area requesting data processing and/or performing data processing.

In this manner, the throttling and/or sharding may be flexibly based on one or more conditions to route some transaction messages to first transaction processing platform 120A and others to second transaction processing platform 120B. The setting of the throttling conditions are also customizable and/or reconfigurable as conditions change. This may be performed to limit disruptions in service to requester systems 130 and/or other merchant systems.

At 410, CMTRP system 110 establishes a mirrored connection to the first transaction processing platform 120A. This may occur in a manner similar to 320 as described with reference to FIG. 3. In some embodiments, CMTRP system 110 may have previously established the mirrored connection. For example, this may have occurred when executing the passthrough configuration. In some embodiments, CMTRP system 110 may have generated the mirrored connection for other transaction message routing according to the throttling configuration for this or other requester systems 130. CMTRP system 110 may use this mirrored connection and/or generate a new mirrored connection for facilitating messages routed to the first transaction processing platform 120A according to the throttling configuration.

At 415, CMTRP system 110 receives a first transaction message. This may occur in a manner similar to 325. As described with reference to FIG. 3, requester system 130 may transmit the first transaction message.

At 420, CMTRP system 110 routes the first transaction message to the first transaction processing platform 120A via the mirrored connection according to the throttling configuration and using a TCP connection manager 112. For example, the first transaction message may be characterized and/or share a quality with the first set of transaction messages. As previously explained, these may be based on one or more of the conditions described with reference to 405. For example, the condition may be based on a type of the first transaction message and a percentage of those types of transaction messages. The throttling configuration may indicate that authorization request messages are to be split between the first transaction processing platform 120A and the second transaction processing platform 120B. The throttling configuration may also indicate that twenty-five percent of the authorization request messages are to be routed to second transaction processing platform 120B. For example, twenty-five percent of the amount of traffic and/or amount of messages per an interval of time should be directed to second transaction processing platform 120B. CMTRP system 110 may determine that to support this balance of messages, the first transaction message is to be transmitted to the first transaction processing platform 120A. In some embodiments, CMTRP system 110 may determine that the first transaction message corresponds to the first set of transaction messages based on the characteristics and/or parameters corresponding to the first transaction message. This may occur in the manner described with reference to 405.

At 425, CMTRP system 110 receives a second transaction message. This may occur in a manner similar to 325. As described with reference to FIG. 3, requester system 130 may transmit the second transaction message. In some embodiments, a different requester system 130 may transmit the second transaction message.

At 430, CMTRP system 110 routes the second transaction message to the second transaction processing platform 120B according to the throttling configuration. For example, the second transaction message may be characterized and/or share a quality with the second set of transaction messages. As previously explained, these may be based on one or more of the conditions described with reference to 405. For example, if the throttling condition is based on functionality and/or percentage of traffic, CMTRP system 110 may route the second transaction message according to these conditions. For example, the throttling configuration may indicate that authorization request messages are to be split between the first transaction processing platform 120A and the second transaction processing platform 120B. The throttling configuration may also indicate that twenty-five percent of the authorization request messages are to be routed to second transaction processing platform 120B. CMTRP system 110 may determine that to support this balance of messages, the second transaction message is to be transmitted to the second transaction processing platform 120B. In some embodiments, CMTRP system 110 may determine that the second transaction message corresponds to the second set of transaction messages based on the characteristics and/or parameters corresponding to the second transaction message. This may occur in the manner described with reference to 405.

CMTRP system 110 may also route transaction messages based on different requester systems 130. For example, CMTRP system 110 may manage routing for a plurality of requester systems 130. The first transaction message may correspond to a first requester system 130. A throttling configuration corresponding to the first requester system 130 may direct CMTRP system 110 to route the first transaction message to first transaction processing platform 120A. Similarly, the second transaction message may correspond to a second requester system 130. A throttling configuration corresponding to the second requester system 130 may direct CMTRP system 110 to route the second transaction message to second transaction processing platform 120B.

Figure 5:
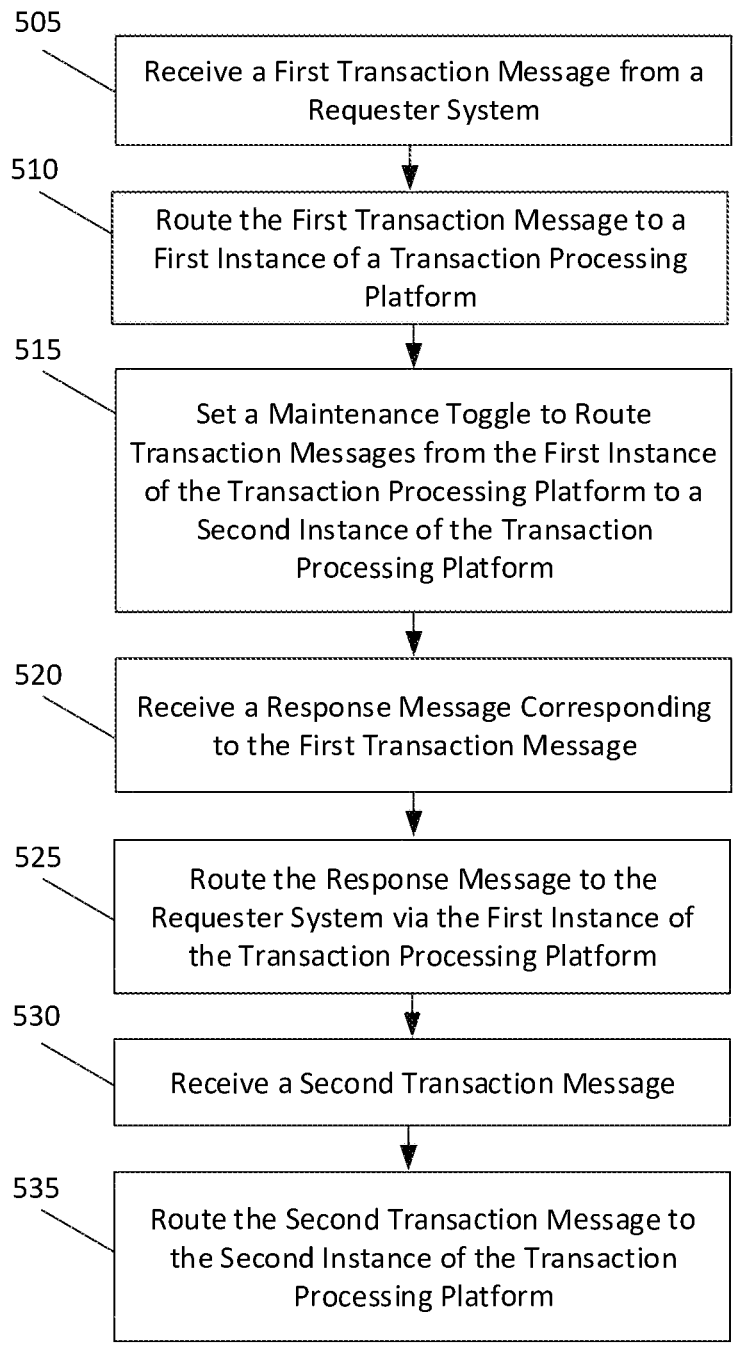
FIG. 5 depicts a flowchart illustrating a method for utilizing a maintenance toggle configuration, according to some embodiments.

FIG. 5 depicts a flowchart illustrating a method 500 for utilizing a maintenance toggle configuration, according to some embodiments. Method 500 shall be described with reference to FIG. 2; however, method 500 is not limited to that example embodiment. For example, method 500 may also be implemented in the environment described with reference to FIG. 1.

In an embodiment, first CMTRP system 210A may utilize method 500 to route traffic in maintenance contexts. To perform this routing, first CMTRP system 210A may establish connections to a first instance and a second instance of a transaction platform 220. When a particular transaction processing platform 220 is being taken offline for maintenance, first CMTRP system 210A may route traffic and/or transaction messages from the first instance to the second instance of the transaction processing platform 220. This routing may be based on a maintenance toggle configuration and/or setting. The foregoing description will describe an embodiment of the execution of method 500 with respect to CMTRP system 210A. While method 500 is described with reference to CMTRP system 210A, method 500 may be executed on any computing device, such as, for example, the computer system described with reference to FIG. 7 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 5, as will be understood by a person of ordinary skill in the art.

At 505, first CMTRP system 210A receives a first transaction message from a requester system 230. This may occur in a manner similar to 325 as described with reference to FIGS. 3 and/or 415 or 425 as described with reference to FIG. 4.

At 510, first CMTRP system 210A routes the first transaction message to a first instance of a transaction processing platform 220. For example, this routing may occur using a first instance of second transaction processing platform 220B accessed via transaction router 214A. Second transaction processing platform 220B may process the first transaction message and/or provide a response message as previously described. While this description may describe instances of the second transaction processing platform 220B, the description of instances may also apply to first transaction processing platform 220A.

At 515, first CMTRP system 210A sets a maintenance toggle to route transaction messages from the first instance of the transaction processing platform 220 to a second instance of the transaction processing platform 220. The maintenance toggle may be a routing configuration indicating that another instance of a particular transaction processing platform 220 is to be used to process a transaction message. In some embodiments, when a maintenance toggle is set, traffic may be diverted to a different data center, another CMTRP system 210B, and/or another transaction router 214B. For example, upon setting of the maintenance toggle, CMTRP system 210A and/or transaction router 214A may divert messaging traffic to CMTRP system 210B and/or transaction router 214B. This may be another instance of a data center corresponding to second transaction processing platform 220B. This may be used when a particular data center is undergoing maintenance and/or is unavailable.

In some embodiments, a maintenance toggle may also be used as a global diverting of messaging traffic. For example, the maintenance toggle may be used to divert traffic for multiple requester systems 230 from second transaction processing platform 220B to firs transaction processing platform 220A. This global diversion may also apply to sending traffic to the second instance of the second transaction processing platform 220B.

At 520, first CMTRP system 210A receives a response message corresponding to the first transaction message. For example, the response message may have been returned as a result of processing the transaction message. The response message may be returned from the second transaction processing platform 220B and/or from issuer system 240. In some embodiments, first CMTRP system 210A may receive the response message after the maintenance toggle has been set. In this case, first CMTRP system 210A may still route the response message back to request system 230. First CMTRP system 210A may allow for the return of the response messages while routing request messages to the second instance of the data center. This allowance may still allow for avoiding disruptions as response messages are still processed. To process these response messages, first CMTRP system 210A may wait for the completion of processing prior to taking an instance offline.

At 525, first CMTRP system 210A routes the response message to the requester system 230 via the first instance of the transaction processing platform. For example, this routing may include issuer system 240 providing response data which may then be used by the first instance of the second transaction processing platform 220B to complete the request. The first instance of the second transaction processing platform 220B may use this data for processing the request and/or return the data to first CMTRP system 210A. First CMTRP system 210A may then return the corresponding response to the requester system. Even though the maintenance toggle has been set, the returned response message may be completed before the first instance is taken offline.

At 530, first CMTRP system 210A receives a second transaction message. At 535, first CMTRP system 210A routes the second transaction message to the second instance of the transaction processing platform 220. In some embodiments, this may occur while the response message in 520 and/or 525 is being processed. For example, first CMTRP system 210A may be configured to perform the routing of messages to the second instance of the second transaction processing platform 220B when the maintenance toggle is set. In some embodiments, this routing may occur after response messages have been processed. For example, when the first instance has been taken offline and first CMTRP system 210A receives the second transaction message, first CMTRP system 210A routes the second transaction message to the second instance of the transaction processing platform 220. In this way, disruptions to processing and/or service may be avoided even when an instance of the second transaction processing platform 220B is taken offline.

Figure 6:
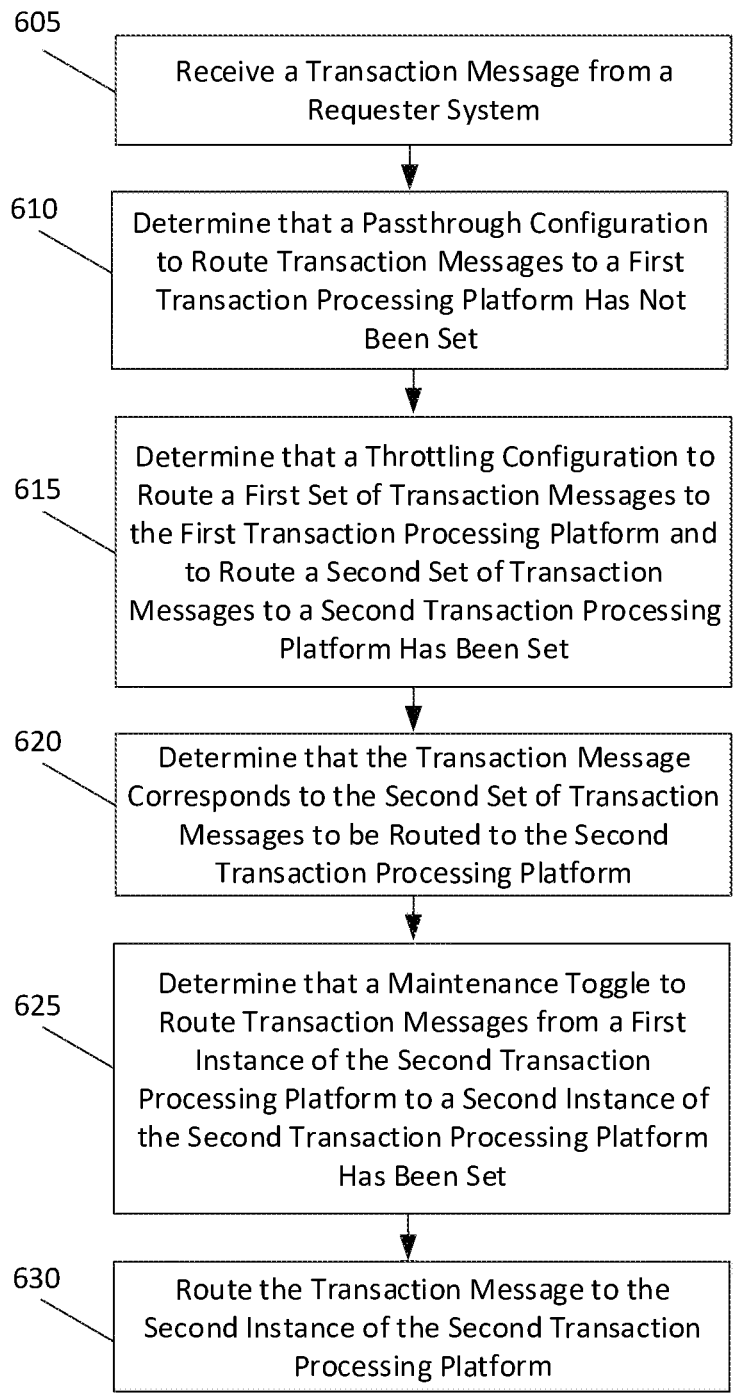
FIG. 6 depicts a flowchart illustrating a method for implementing passthrough, throttling, and maintenance toggle configurations, according to some embodiments.

FIG. 6 depicts a flowchart illustrating a method 600 for implementing passthrough, throttling, and maintenance toggle configurations, according to some embodiments. Method 600 shall be described with reference to FIG. 2; however, method 600 is not limited to that example embodiment. For example, method 600 may also be implemented in the environment described with reference to FIG. 1.

In an embodiment, first CMTRP system 210A may utilize method 600 to implement one or more routing configurations. These may include the routing configurations described with reference to FIGS. 3, 4, and 5. First CMTRP system 210A may implement passthrough, throttling, and/or maintenance toggle configurations. These may be implemented simultaneously and/or at different times. First CMTRP system 210A may also change when one or more routing configurations is applied. The foregoing description will describe an embodiment of the execution of method 600 with respect to CMTRP system 210A. While method 600 is described with reference to CMTRP system 210A, method 600 may be executed on any computing device, such as, for example, the computer system described with reference to FIG. 7 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 6, as will be understood by a person of ordinary skill in the art.

At 605, first CMTRP system 210A receives a transaction message from a requester system 230. First CMTRP system 210A may check for any routing configurations that may have been set. For example, first CMTRP system 210A determines whether a passthrough, throttling, and/or a maintenance toggle configuration has been set. As previously described, one or more of these routing configurations may be set to route transaction messages.

At 610, first CMTRP system 210A determines that a passthrough configuration to route transaction messages to a first transaction processing platform has not been set. This may occur as part of the checking the routing configurations. If the passthrough configuration has been set, first CMTRP system 210A may execute method 300 as described with reference to FIG. 3. When a passthrough configuration has not been set, first CMTRP system 210A proceeds to 615.

At 615, first CMTRP system 210A determines that a throttling configuration to route a first set of transaction messages to a first transaction processing platform 220A and to route a second set of transaction message to a second transaction processing platform 220B has been set. This determination may be similar to that described with respect to method 400 and FIG. 4. This may occur when checking the setting of routing configurations.

At 620, first CMTRP system 210A determines that the transaction message corresponds to the second set of transaction messages to be routed to the second transaction processing platform 220B. This determination may also be similar to that described with respect to method 400 and FIG. 4. This may occur when checking the setting of routing configurations.

At 625, first CMTRP system 210A determines that a maintenance toggle to route transaction messages from a first instance of the second transaction processing platform 220B to a second instance of the second transaction processing platform 220B has been set. This determination may also be similar to that described with respect to method 500 and FIG. 5. This may occur when checking the setting of routing configurations. As described with reference to FIG. 5, when the maintenance toggle is set, first CMTRP system 210A may be configured to route transaction messages to second CMTRP system 210B. This may include routing messages to transaction router 214B. At 630, first CMTRP system 210A routes the transaction message to the second instance of the second transaction processing platform 220B. This may occur in a manner similar to method 500.

As seen in method 600, first CMTRP system 210A may implement and/or combine one or more routing configurations. These may be implemented simultaneously and/or at different times. For example, first CMTRP system 210A may be reconfigured. First CMTRP system 210A may be provided with executable instructions that change the particular routing configurations to apply and/or the parameters of the routing configurations. Using the routing parameters, disruptions of service may be minimized and/or avoided.

Figure 7:
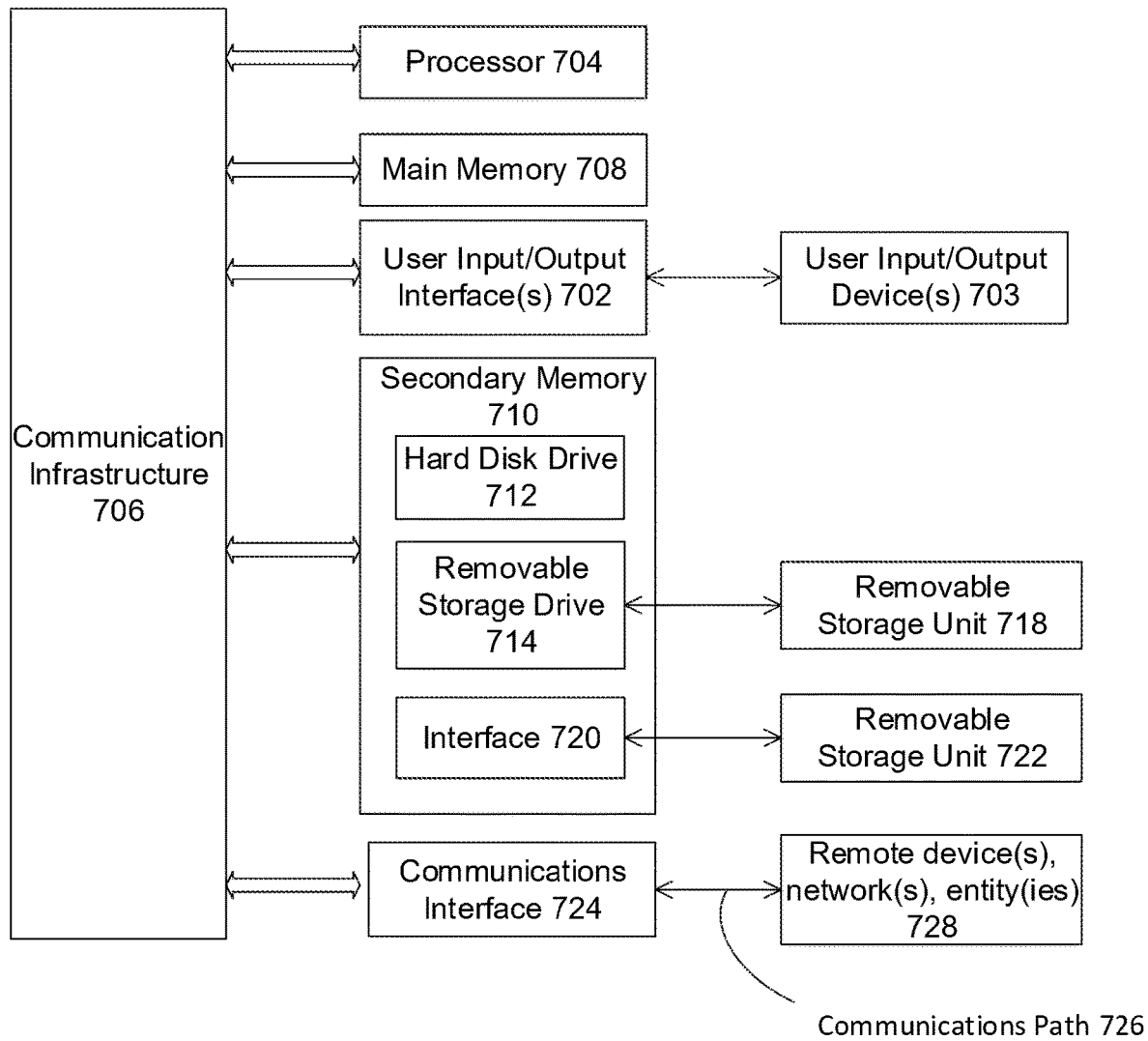
FIG. 7 depicts an example computer system useful for implementing various embodiments.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
    setting, at a connection management and transaction routing platform (CMTRP) system, a throttling configuration to route a first set of transaction messages to a first transaction processing platform and to route a second set of transaction messages to a second transaction processing platform;

establishing, by the CMTRP system, a mirrored connection to the first transaction processing platform using a Transmission Control Protocol (TCP) connection manager;

receiving, by the CMTRP system, a first transaction message;

routing, by the CMTRP system, the first transaction message to the first transaction processing platform via the mirrored connection and using the TCP connection manager according to the throttling configuration;

receiving, by the CMTRP system, a second transaction message; and routing, by the CMTRP system, the second transaction message to the second transaction processing platform according to the throttling configuration.

2. The computer implemented method of claim 1, wherein the throttling configuration indicates a first percentage of transaction message traffic to be routed to the first transaction processing platform and a second percentage of transaction message traffic to be routed to the second transaction processing platform.

3. The computer implemented method of claim 1, wherein the throttling configuration indicates a message type corresponding to functionality performed by the second transaction processing platform, and wherein routing the second transaction message further comprises:
determining that the second transaction message corresponding to the message type and includes a request for the functionality performed by the second transaction processing platform.

4. The computer implemented method of claim 1, wherein the throttling configuration includes a merchant identifier, and wherein routing the second transaction message further comprises:
determining that the second transaction message includes the merchant identifier.

5. The computer implemented method of claim 1, further comprising:
setting, by the CMTRP system, a passthrough configuration to route transaction messages to the first transaction processing platform; and
routing, by the CMTRP system, subsequent transaction messages to the first transaction processing platform when the passthrough configuration is set.

6. The computer implemented method of claim 1, further comprising:
establishing a connection to a first instance of the second transaction processing platform;
establishing a connection to a second instance of the second transaction processing platform; and
setting, by the CMTRP system, a maintenance toggle configuration to route transaction messages from the first instance to the second instance of the second transaction processing platform.

7. The computer implemented method of claim 1, wherein transaction messages correspond to an authorization request to authorize a transaction at a point of sale system.

8. A system, comprising:
a memory; and
at least one processor coupled to the memory and configured to:
set a throttling configuration to route a first set of transaction messages to a first transaction processing platform and to route a second set of transaction messages to a second transaction processing platform;
establish a mirrored connection to the first transaction processing platform using a Transmission Control Protocol (TCP) connection manager;
receive a first transaction message;
route the first transaction message to the first transaction processing platform via the mirrored connection and using the TCP connection manager according to the throttling configuration;
receive a second transaction message; and
route the second transaction message to the second transaction processing platform according to the throttling configuration.

9. The system of claim 8, wherein the throttling configuration indicates a first percentage of transaction message traffic to be routed to the first transaction processing platform and a second percentage of transaction message traffic to be routed to the second transaction processing platform.

10. The system of claim 8, wherein the throttling configuration indicates a message type corresponding to functionality performed by the second transaction processing platform, and wherein to route the second transaction message, the at least one processor is further configured to:
determine that the second transaction message corresponding to the message type and includes a request for the functionality performed by the second transaction processing platform.

11. The system of claim 8, wherein the throttling configuration includes a merchant identifier, and wherein to route the second transaction message, the at least one processor is further configured to:
determine that the second transaction message includes the merchant identifier.

12. The system of claim 8, wherein the at least one processor is further configured to:
set a passthrough configuration to route transaction messages to the first transaction processing platform; and
route subsequent transaction messages to the first transaction processing platform when the passthrough configuration is set.

13. The system of claim 8, wherein the at least one processor is further configured to:
establish a connection to a first instance of the second transaction processing platform;
establish a connection to a second instance of the second transaction processing platform; and
set a maintenance toggle configuration to route transaction messages from the first instance to the second instance of the second transaction processing platform.

14. The system of claim 8, wherein transaction message correspond to an authorization request to authorize a transaction at a point of sale system.

15. A non-transitory computer-readable device having instructions stored thereon that, when executed by at least one computing device, cause the at least one computing device to perform operations comprising:
setting a throttling configuration to route a first set of transaction messages to a first transaction processing platform and to route a second set of transaction messages to a second transaction processing platform;
establishing a mirrored connection to the first transaction processing platform using a Transmission Control Protocol (TCP) connection manager;
receiving a first transaction message;
routing the first transaction message to the first transaction processing platform via the mirrored connection and using the TCP connection manager according to the throttling configuration;

receiving a second transaction message; and routing the second transaction message to the second transaction processing platform according to the throttling configuration.

16. The non-transitory computer-readable device of claim 15, wherein the throttling configuration indicates a first percentage of transaction message traffic to be routed to the first transaction processing platform and a second percentage of transaction message traffic to be routed to the second transaction processing platform.

17. The non-transitory computer-readable device of claim 15, wherein the throttling configuration indicates a message type corresponding to functionality performed by the second transaction processing platform, and wherein routing the second transaction message further comprises:

determining that the second transaction message corresponding to the message type and includes a request for the functionality performed by the second transaction processing platform.

18. The non-transitory computer-readable device of claim 15, wherein the throttling configuration includes a merchant identifier, and wherein routing the second transaction message further comprises:

determining that the second transaction message includes the merchant identifier.

19. The non-transitory computer-readable device of claim 15, the operations further comprising:

setting a passthrough configuration to route transaction messages to the first transaction processing platform; and routing subsequent transaction messages to the first transaction processing platform when the passthrough configuration is set.

20. The non-transitory computer-readable device of claim 15, the operations further comprising:

establishing a connection to a first instance of the second transaction processing platform;

establishing a connection to a second instance of the second transaction processing platform; and setting a maintenance toggle configuration to route transaction messages from the first instance to the second instance of the second transaction processing platform.

* * * * *